(12) United States Patent
Sarangdhar et al.

(10) Patent No.: US 9,411,748 B2
(45) Date of Patent: *Aug. 9, 2016

(54) SECURE REPLAY PROTECTED STORAGE

(71) Applicant: Intel Corporation, Santa Clara, CA (US)

(72) Inventors: Nitin V. Sarangdhar, Portland, OR (US); William A. Stevens, Jr., Folsom, CA (US); John J. Vranich, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 497 days.

This patent is subject to a terminal disclaimer.

(21) Appl. No.: 13/631,556

(22) Filed: Sep. 28, 2012

(65) Prior Publication Data

US 2013/0159727 A1    Jun. 20, 2013

(51) Int. Cl.
*H04L 9/32* (2006.01)
*G06F 12/14* (2006.01)
*G06F 21/44* (2013.01)
*G06F 21/79* (2013.01)

(52) U.S. Cl.
CPC .......... *G06F 12/1408* (2013.01); *G06F 21/445* (2013.01); *G06F 21/79* (2013.01)

(58) Field of Classification Search
CPC ................................................ H04L 29/06911
USPC .................................................. 713/165, 189
See application file for complete search history.

(56) References Cited

U.S. PATENT DOCUMENTS 5,410,710 A    4/1995 Sarangdhar et al.
5,515,516 A    5/1996 Fisch et al.
5,550,988 A    8/1996 Sarangdhar et al.
5,551,005 A    8/1996 Sarangdhar et al.

(Continued)

FOREIGN PATENT DOCUMENTS

CN    101388053 A    3/2009
CN    101589399 A    11/2009

OTHER PUBLICATIONS

PCT International Search Report for PCT Counterpart Application No. PCT/US2011/066188, 3 pgs., mailed Jul. 18, 2012.

(Continued)

*Primary Examiner* — Christopher Brown
(74) *Attorney, Agent, or Firm* — Blakely, Sokoloff, Taylor & Zafman LLP

(57) ABSTRACT

Embodiments of the invention create an underlying infrastructure in a flash memory device (e.g., a serial peripheral interface (SPI) flash memory device) such that it may be protected against user attacks—e.g., replacing the SPI flash memory device or a man-in-the-middle (MITM) attack to modify the SPI flash memory contents on the fly. In the prior art, monotonic counters cannot be stored in SPI flash memory devices because said devices do not provide replay protection for the counters. A user may also remove the flash memory device and reprogram it. Host platforms alone cannot protect against such hardware attacks.

Embodiments of the invention enable secure standard storage flash memory devices such as SPI flash memory devices to achieve replay protection for securely stored data. Embodiments of the invention utilize flash memory controllers, flash memory devices, unique device keys and HMAC key logic to create secure execution environments for various components.

20 Claims, 6 Drawing Sheets

(56) References Cited

U.S. PATENT DOCUMENTS

| | | |
|---|---|---|
| 5,555,420 A | 9/1996 | Sarangdhar et al. |
| 5,572,702 A | 11/1996 | Sarangdhar et al. |
| 5,572,703 A | 11/1996 | MacWilliams et al. |
| 5,615,343 A | 3/1997 | Sarangdhar et al. |
| 5,623,628 A | 4/1997 | Brayton et al. |
| 5,682,516 A | 10/1997 | Sarangdhar et al. |
| 5,701,503 A | 12/1997 | Singh et al. |
| 5,724,527 A | 3/1998 | Karnik et al. |
| 5,774,700 A | 6/1998 | Fisch et al. |
| 5,797,026 A | 8/1998 | Rhodehamel et al. |
| 6,006,299 A | 12/1999 | Wang et al. |
| 6,061,599 A | 5/2000 | Rhodehamel et al. |
| 6,405,271 B1 | 6/2002 | MacWilliams et al. |
| 6,711,675 B1 | 3/2004 | Spiegel et al. |
| 6,938,127 B2 | 8/2005 | Fletcher et al. |
| 6,938,153 B2 | 8/2005 | Poisner et al. |
| 6,986,035 B2 | 1/2006 | Stevens, Jr. et al. |
| 7,254,676 B2 | 8/2007 | Datta et al. |
| 7,299,463 B2 | 11/2007 | Brannock et al. |
| 7,376,870 B2 | 5/2008 | Kataria et al. |
| 7,774,619 B2 | 8/2010 | Paaske et al. |
| 8,014,530 B2 | 9/2011 | Brickell et al. |
| 8,028,282 B2 | 9/2011 | Brannock et al. |
| 8,646,052 B2 | 2/2014 | Vembu et al. |
| 8,762,742 B2 * | 6/2014 | Buer .............................. 713/193 |
| 8,880,904 B2 | 11/2014 | Apvrille et al. |
| 2003/0046524 A1 | 3/2003 | Zimmer et al. |
| 2003/0188146 A1 | 10/2003 | Hale et al. |
| 2005/0027940 A1 | 2/2005 | Zimmer et al. |
| 2006/0107032 A1 | 5/2006 | Paaske et al. |
| 2006/0136765 A1 | 6/2006 | Poisner et al. |
| 2006/0271796 A1 * | 11/2006 | Kaimal et al. ................. 713/194 |
| 2007/0073416 A1 * | 3/2007 | Grawrock ......................... 700/1 |
| 2008/0130875 A1 | 6/2008 | Ahlquist |
| 2008/0320263 A1 | 12/2008 | Nemiroff et al. |
| 2009/0259877 A1 * | 10/2009 | Vyssotski et al. ............ 713/502 |
| 2011/0161672 A1 | 6/2011 | Martinez et al. |
| 2013/0262877 A1 | 10/2013 | Neve De Mevergnies et al. |

OTHER PUBLICATIONS

PCT Written Opinion of the International Searching Authority for PCT Counterpart Application No. PCT/US2011/066188, 4 pgs., mailed Jul. 18, 2012.

Notification Concerning Transmittal of International Preliminary Report on Patentability and Written Opinion of the International Searching Authority for Application No. PCT/US2011/066188 mailed Jul. 3, 2014, 6 pages.

* cited by examiner

US 9,411,748 B2

SECURE REPLAY PROTECTED STORAGE

This application is a continuation-in-part of International Patent Application Number PCT/US2011/066188, filed Dec. 20, 2011, and claims priority to and is incorporated herewith.

FIELD

Embodiments of the invention generally pertain to computing devices and more particularly to the use of monotonic counters in computing devices.

BACKGROUND

Computer security refers to information security associated with computer platforms. The objective of computer security is to ensure the confidentiality, integrity, and/or availability of information that is stored or processed on the computer platform. Computer security may reduce the vulnerability of computer-based information to malicious software and hardware based user attacks. Computing platforms therefore include physical and logical features to provide a secure execution environment (SEE). A monotonic counter may be included as part of the SEE and may be used in combination with various authentication procedures to prevent user attacks.

A monotonic counter is implemented to produce incrementing or decrementing values. For the incrementing values implementation, once the count value changes to a higher number, it should not thereafter exhibit any value less than the higher number. For the decrementing values implementation, once the count value changes to a lower number, it should not thereafter exhibit any value greater than the lower number. For either implementation, the monotonic nature of the count value should be maintained throughout the life of the device in which the monotonic counter operates, including across any number of power-on and power-off cycles. Causing a monotonic counter to not maintain its count value and revert to an earlier value can result in a compromise in the device's security (referred to herein as a "replay attack").

Computer platforms may utilize a specific memory module for storing boot instructions (e.g., basic input output system (BIOS) instructions). A serial peripheral interface (SPI) flash memory device is commonly used as a storage for these instructions. SPI flash memory is an ideal candidate for storing monotonic counters; however, standard SPI Flash memory devices do not support a mechanism to protect monotonic counter values from replay attacks (thus, availability of reliable monotonic counters for devices provides the fundamental capability to build replay protection).

Prior art solutions for replay protection of monotonic counters can be built with on-chip flash; however on-chip flash is not always possible with high performance silicon devices for silicon processing reasons, and without adding substantial cost. Prior art solutions can also be built with on-chip static random access memory (SRAM) with modest cost; however on-chip SRAM needs to be powered up at all times. If power is removed, the data in the SRAM is lost. Prior art solutions that utilize monotonic counters may move them to a different memory device that provides replay protected memory—e.g. an embedded multi-media card (eMMC) device; however, these prior art solutions provide the replay protection using a large block of memory at a very significant cost.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention create an underlying infrastructure in a flash memory device (e.g., a serial peripheral interface (SPI) flash memory device) such that it may be protected against user attacks—e.g., replacing the SPI flash memory device or a man-in-the-middle (MITM) attack to modify the SPI flash memory contents on the fly. In the prior art, monotonic counters cannot be stored in SPI flash memory devices because said devices do not provide replay protection for the counters. For example, a user may remove the flash memory device and reprogram it. Host platforms alone cannot protect against such hardware attacks.

Embodiments of the invention enable secure standard storage flash memory devices such as SPI flash memory devices to achieve replay protection for securely stored monotonic counter values. Embodiments of the invention utilize flash memory controllers, flash memory devices, unique device keys and Hash-based Message Authentication Code (HMAC) key logic to create multiple secure execution environments (SEE) for various platform components.

Figure 1:
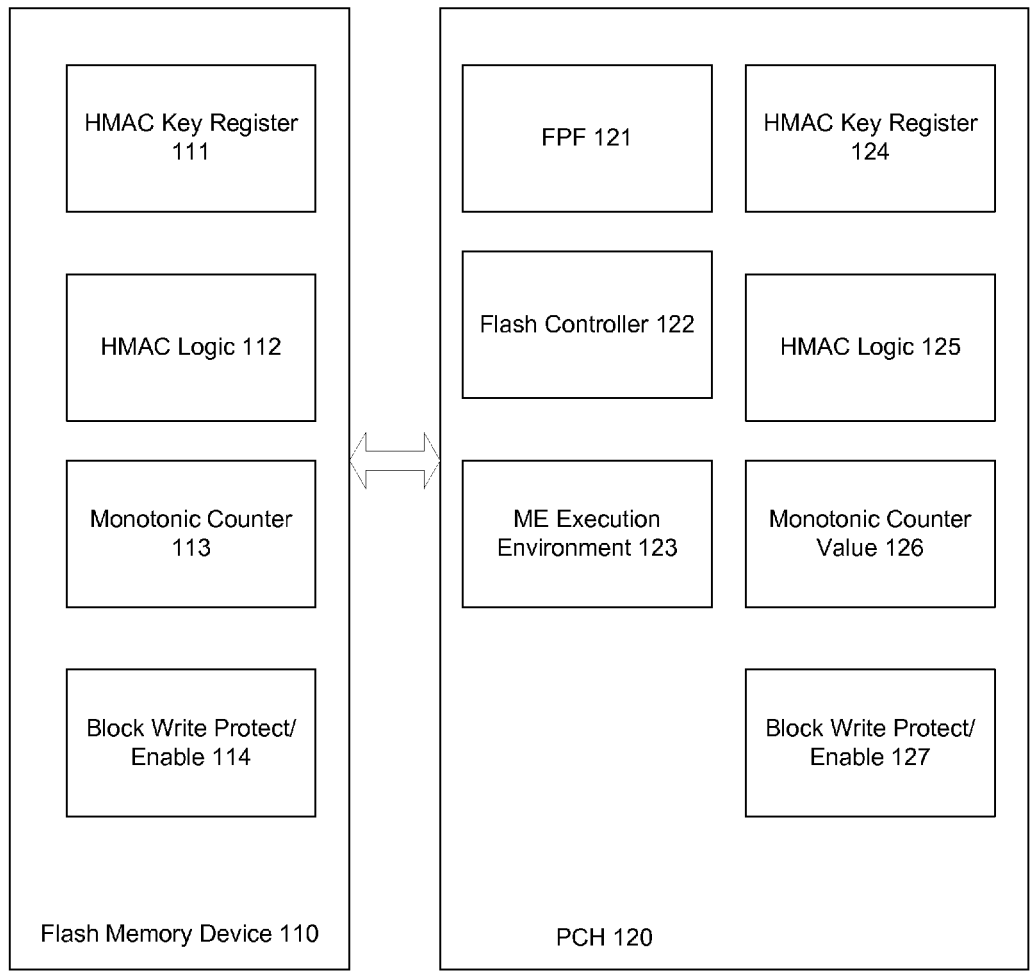
FIG. 1 is a block diagram of an embodiment of the invention.

FIG. 1 is a block diagram of an embodiment of the invention. System 100 is shown to include flash memory device 110 and platform interconnect 120 (e.g., a platform controller hub (PCH)). In this embodiment, SPI flash memory device 110, communicates with platform interconnect 120 using an SPI protocol, and embodiments of the invention are implemented as extensions to said protocol; in other embodiments, other non-volatile memory devices and protocols may be used as described below.

SPI flash memory device 110 includes HMAC key register 111, HMAC logic 112, monotonic counter 113, and block write protection logic 114 that disables/enables writing to the memory of the flash memory device. HMAC key register 111 may store one or more device HMAC keys received from platform interconnect 120 (described below). In one embodiment, HMAC key register 111 is non-readable, and said device HMAC key is permanently written to said register. HMAC logic 112 shall verify authenticated commands received from platform interconnect 120, and shall also generate authenticated responses to said commands, utilizing the above described device HMAC key. In one embodiment, said HMAC logic utilizes a Hash-based Message Authentication Code/Secure Hash Algorithm (HMAC-SHA) algorithm for authenticating requests and generating responses (e.g., an HMAC-SHA-256 signing algorithm). In other embodiments, any other similar signing algorithm may be utilized.

In an embodiment for SPI Flash using the SPI protocol, the authenticated commands in Table 1 below can be used.

TABLE 1

| Function | Opcode Phase 8 bits | Payload Phase Max 512 Bits | | Comment |
|---|---|---|---|---|
| | | Byte# | Field Description | |
| Command: Write Root Key Register | OP1 | 1 | CmdType[7:0] = 00H | OP1 + Payload phase driven by host controller. Root Key Register is written only once. |
| | | 2 | CounterAddr[7:0] = 8 Bits | |
| | | 3 | Reserved[7:0] = 8 Bits | |
| | | 4-35 | RootKey[255:0] = 256 Bits | |
| | | 36-63 | TruncatedSign[223:0] = 224 Bits | |
| Command: Update HMAC Key Register | OP1 | 1 | CmdType[7:0] = 01H | OP1 + Payload phase is Issued by host controller on every power up to initialize HMAC Key Register. |
| | | 2 | CounterAddr[7:0] = 8 Bits | |
| | | 3 | Reserved[7:0] = 8 Bits | |
| | | 4-7 | KeyData[31:0] = 32 Bits, | |
| | | 8-39 | Signature[255:0] = 256 Bits | |
| Command: Increment Monotonic Counter | OP1 | 1 | CmdType[7:0] = 02H | OP1 + Payload Phase is Issued by host controller during runtime to increment the counter. |
| | | 2 | CounterAddr[7:0] = 8 Bits | |
| | | 3 | Reserved[7:0] = 8 Bits | |
| | | 4-7 | CounterData[31:0] = 32 Bits, | |
| | | 8-39 | Signature[255:0] = 256 Bits | |
| Command: Request Monotonic Counter | OP1 | 1 | CmdType[7:0] = 03H | OP1 + Payload Phase is Issued by host controller during runtime to request counter data |
| | | 2 | CounterAddr[7:0] = 8 Bits | |
| | | 3 | Reserved[7:0] = 8 Bits | |
| | | 4-15 | Tag [95:0] = 96 Bits | |
| | | 16-47 | Signature[255:0] = 256 Bits | |
| Command: Read Data | OP2 | 2 | ExtendedStatus[7:0] = 8 Bits | OP2 is issued by Host Controller generally after an OP1. SPI Flash device responds with the Payload phase to return Extended Status and counter data. |
| | | 3-14 | Tag[95:0] = 96 Bits | |
| | | 15-18 | CounterData[31:0] = 32 Bits | |
| | | 19-50 | Signature[255:0] = 256 Bits | |
| Reserved Commands | OP1 | 2 | CmdType = 04H-0FFH | These OP1 commands are reserved and cannot be used |
| Command: Erase Sector | OP1 | 1 | Cmdtype[7:0] = 04H | Signature[255:0] may come as bytes 4-35 on all commands including the one's currently defined. |
| | | 2 | CounterAddr[7:0] = 8 bits | |
| | | 3 | Reserved = 8 Bits | |
| | | 4-7 | CounterData[31:0] = 32 bits | |
| | | 8-39 | Signature[255:0] = 256 Bits | |
| | | 12-43 | Address[31:0] = 32 Bits | |
| Command: Write Data | OP1 | 1 | Cmdtype[7:0] = 05H | Maximum Data Length is 64 Bytes |
| | | 2 | CounterAddr[7:0] = 8 Bits | |
| | | 3 | DataLength = 8 Bits | |
| | | 4-7 | CounterData[31:0] = 32 bits | |
| | | 8-39 | Signature[255:0] = 256 Bits | |
| | | 12-43 | Address[31:0] = 32 Bits | |
| | | 44-63 | Data[MSB:LSB] = As required | |
| | | 64-127 | Data[MSB:LSB] = As required | |

TABLE 1-continued

| Function | Opcode Phase 8 bits | Byte# | Payload Phase Max 512 Bits Field Description | Comment |
|---|---|---|---|---|
| Command: Read Data | OP1 | 1 | Cmdtype[7:0] = 06H | Maximum Data Length is 64 Bytes |
| | | 2 | CounterAddr[7:0] = 8 bits | |
| | | 3 | DataLength = 8 Bits | |
| | | 4-15 | Tag[95:0] = 96 Bits | |
| | | 16-47 | Signature[255:0] = 256 Bits | |
| Command: Read Buffer | OP2 | 2 | ExtendedStatus[7:0] = 8 bits | |
| | | 3-14 | Tag[95:0] = 96 Bits | |
| | | 15-46 | Signature[255:0] = 256 Bits | |
| | | 47-63 | Data[MSB:LSB] = As required | |
| | | 64-127 | Data[MSB:LSB] = As required | |

Monotonic counter (or counters) 113 represents hardware storage of a monotonic counter value. Said monotonic counter may be configured to count (e.g., increment or decrement) when requested to do so, and to produce a monotonic count value in response to a read operation to the counter.

Platform interconnect 120 includes field programmable fuses (FPF) 121, SPI flash controller 122, manageability engine (ME) execution environment 123, HMAC key register 124, HMAC logic 125, monotonic counter logic 126, and block write protection logic 127. ME execution environment 123 provides a secure and isolated environment that may not be accessed, for example, by the host operating system. Said manageability engine (ME) may, for example, authenticate users and control access to peripheral devices (not shown).

Platform interconnect 120 may have a unique device key based, which may be a set of fuses blown to derive a unique device key (blown, for example, during a manufacturing process). In embodiments utilizing HMAC-SHA based messaging, said unique device key may be used to derive a unique HMAC Key stored in HMAC key register 124. During a printed circuit board (PCB) manufacturing process, the unique HMAC key is provisioned into the SPI Flash using a Root key register write command (shown in Table 1 above). This key is written only one time and establishes a common secret between the platform interconnect 120 and SPI Flash 110. In one instantiation HMAC based commands and responses exchanged between SPI flash memory device 110 and platform interconnect 120, as described below, ensure the storage of replay protected data in said flash memory device.

In an embodiment for an SPI interface,—OP1/OP2 command(s) are issued with the format shown below in Table 2:

TABLE 2

| Byte # | 0 | 1 | 2 | 3 | 4 | 5 | 6 | ... | ... | ... |
|---|---|---|---|---|---|---|---|---|---|---|
| Name | OP1 | CmdType | Counter Address | As defined in the table 1 | | | | | | |
| Name | OP2 | Dummy Bits | Extended Status | As defined in the table 1 | | | | | | |

After an OP1 command is received, the SPI Flash sets Busy immediately and resets it after the command is fully executed. The controller can poll for the status of the Busy bit using the Poll Status command. After the busy bit is reset the extended status field contains the detailed status of the executed command. The controller can read the extended status after receiving Busy bit reset in response to the Poll Status command.

Write Enable (WREN) may be required before issuing OP1 for all command types. The SPI Flash checks for valid WREN related state prior to executing OP1 command and alters the Write enable related state after executing OP1 command. If OP1 command is received and WREN related state is not proper, an error flag is set in Extended Status register.

The extended register status is shown below in Table 3:

TABLE 3

| Extended Status [7:0] | Applicable CmdType(s) | Description |
|---|---|---|
| 00000000 | — | Power On State |
| 10000000 | 00, 01, 02, 03, 04 | Successful completion |
| 0XXXXX1 | 00 | Root Key Register Overwrite |
| 0XXXXX1X | 00, 01, 02, 03, 04 | WREN Latch not set on previous OP1 command |
| 0XXXX1XX | 01, 02, 03, 04 | Signature Mismatch on previous OP1 command |
| 0XXX1XXX | 02, 03, 04 | HMAC Key Register uninitialized on previous OP1 command |
| 0XX1XXXX | 02, 03 | Counter Data Mismatch on previous write |
| 0X1XXXXX | — | Fatal Error, e.g. No valid counter found. |

In a different instantiation the HMAC Root key is stored similar to the first instantiation, but during actual operation an HMAC Operational key is derived based on HMAC root key using an HMAC command operation.

In some embodiments, when a command is issued on the interface, the SPI Flash device ensures that the received transaction is error free. This may include checking conditions, such as:

- Payload size is correct. (including OP1 is 64 bytes)
- Counter Address falls within the range of supported counters.
- The Root Key Register corresponding to the requested Counter Address was previously uninitialized. [e.g., Root_Key_Reg_Init_State[Counter_Address] = 0FFH]
- A truncated signature field is the same as least significant 224 bits of HMAC-SHA-256 based signature computed based on received input parameters:
    HMAC message[31:0] = (OpCode[7:0], CmdType[7:0], CounterAddr[7:0], Reserved[7:0])
    HMAC Key[255:0] = Root_Key[255:0]

Such a comparison may comprise:

```
TruncatedSignature[223:0] = In_Message[223:0]
    // PayloadByte[36] is the first byte containing TruncatedSignature
       MSB
    // PayloadByte[63] is the last byte containing TruncatedSignature
       LSB
```

If the received transaction is error free, the SPI Flash device successfully executes the command and may post a "successful completion" extended status (such a command is executed to ensure that power cycling in the middle of command execution is properly handled; the internal state tracking the root key register initialization is written as the last operation of the command execution. (Root_Key_Reg_Init_State[Counter_Address]=0])

Root Key Register Write (with root key is=256'HFF ... FF) is used as a temporary key. When this request is received error-free, Root_Key_Reg_Init_State[Counter_Address] is not affected. Instead only the corresponding Monotonic Counter is initialized to 0 if previously uninitialized. This state may tracked as a separate state using MC_Init_State [Counter_Address]. This state may be used to leave the monotonic counters at the current value when an error free Root Key Register Write operation is received (i.e., for both 256'HFF ... FF and non 256'HFF ... FF values).

Embodiments of the invention modify SPI Flash memory device 110 by providing a replay protected monotonic counter storage mechanism. This is created by provisioning a common HMAC key exchanged between SPI flash memory device 110 and platform interconnect 120 and stored, for example, in HMAC key registers 111 and 124. In this embodiment, all commands that manipulate monotonic counter 113 are authenticated commands. Since authenticated commands can only be issued by the owner of the device key (in this embodiment, the ME execution environment 123 and the SPI flash memory device 110) no other entity is able to access the monotonic counters in order to read and/or manipulate the counter.

Commands to access or manipulate monotonic counter 113 may be consistent with or be based on the Serial Flash Discoverable Parameters (SFDP) standard (e.g., as defined in JEDEC Standard JESD16, April 2011).

The SFDP standard allows flash memory to be embedded with a description of important device characteristics within the device in a standard set of parameter tables. The host system can then read the parameter tables to understand the functional characteristics and capabilities of the device.

Embodiments of the invention may utilize header fields as described in Table 4 below:

TABLE 4

| | |
|---|---|
| Manufacturer ID | 03H (Even parity, guaranteed to not overlap with any manufacturer's JEDEC ID) |
| Minor revision | 0 |
| Major revision | 1 |
| Parameter Length | 2 |
| Parameter table pointer | =<specified by flash device manufacturer> |

Table 5 is an example of said parameter table:

TABLE 5

| Bits 31:24 | Bits 23:16 | Bits 15:8 | Bits 7:0 |
|---|---|---|---|
| 31:28 Reserved<br>27:24 Update_Rate<br>Rate of Update =<br>5 * (2 **<br>Update_Rate) seconds | OP2 (suggested value 96) | OP1 (suggested value 9B) | Bits 7:4<br>Num_Counter-1 Bits<br>3:2 Reserved Bit<br>1: MC_Size<br>(Monotonic Counter Size)<br>'0': 32 bits<br>'1': Reserved<br>Bit 0:<br>'0': Flash Hardening is supported.<br>'1': Flash Hardening is not supported |
| Reserved | Write Counter Polling Long Delay (Suggested usage: Write + HMAC Operation + Typical Sub Sector Erase Time, Allows controller to conserve power to delay polling if the short delay is not sufficient for completion of the write operation) Bit 7: reserved Bits 6:5: units (1 ms, 16 ms, 128 ms, 1 s) Bits 4:0: Write Counter polling Long delay | Write Counter Polling Short Delay (Suggested usage: Worst Case Write + HMAC operation, No Erase. Allows controller to conserve power by delaying polling) Bit 7: reserved Bits 6:5: units (1 us, 16 us, 128 us, 1 ms) Bits 4:0: Write Counter polling short delay | Read Counter Polling Delay Worst case to calculate HMAC. Allows controller to conserve power by delaying polling. Bit 7: reserved Bits 6:5: units (1 us, 16 us, 128 us, 1 ms) Bits4:0: polling delay_read counter |

Figure 2A:
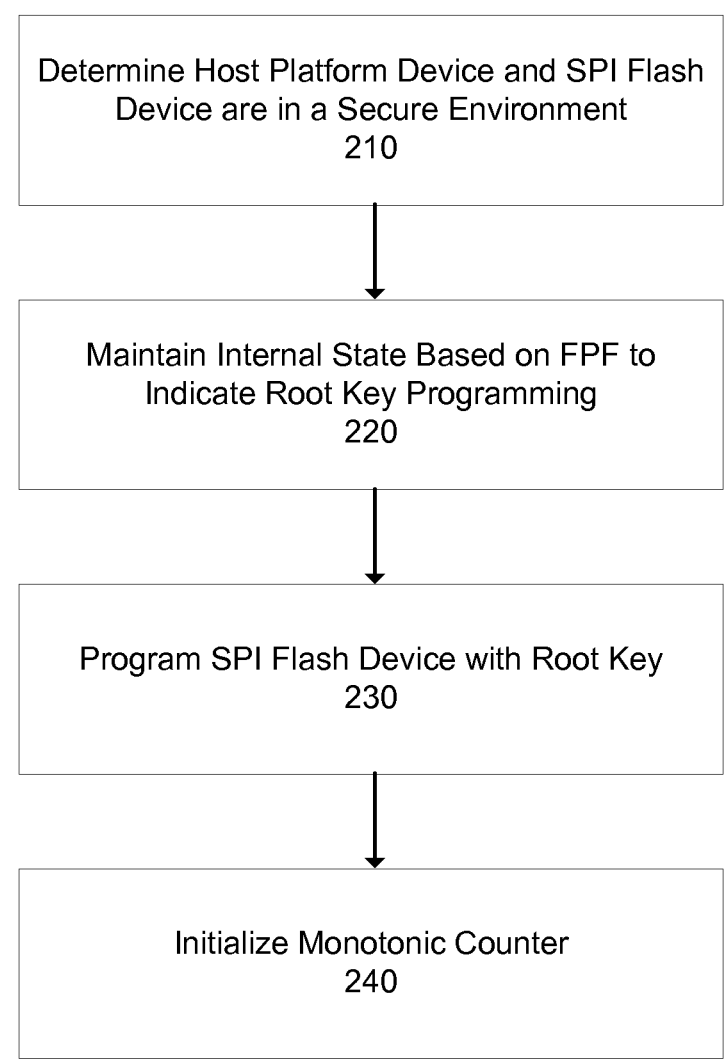
FIG. 2A is a flow chart for a process to generate a unique root key according to an embodiment of the invention.

FIG. 2A is a flow chart for a process to generate a unique root key according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

In one embodiment, process 200 is executed such that a root key is programmed in a secure environment, 210. In one embodiment, the secure environment is a manufacturing environment where the platform device and the SPI device are mounted on the same motherboard or PCB substrate. In a different embodiment, the secure environment is a manufacturing environment where the platform device and the SPI device are mounted in a multi-chip package. Said manufacturing environment is secure in that the SPI interface traces cannot be retained or leaked out once the platform manufacturing is completed.

The host platform device interconnect maintains an internal state based on an FPF to indicate whether this programming was previously done, 220. The FPF can be blown only once and the state cannot be reversed. If FPF is blown it implies that the root key programming was previously done and the root key programming command is not issued. If FPF is not blown the root key programming command is issued and the state is recorded in the platform interconnect by blowing the corresponding FPF. Once this command is successfully completed the platform interconnect and the SPI Flash have the same root key that can be used for future transactions.

Once the SPI flash memory device has been programmed with the root key, 230, the respective monotonic counter may be initialized, 240. In one embodiment, said monotonic counter is initialized to zero. In other embodiments, a non-zero value may be used to initialize said counter.

Figure 2B:
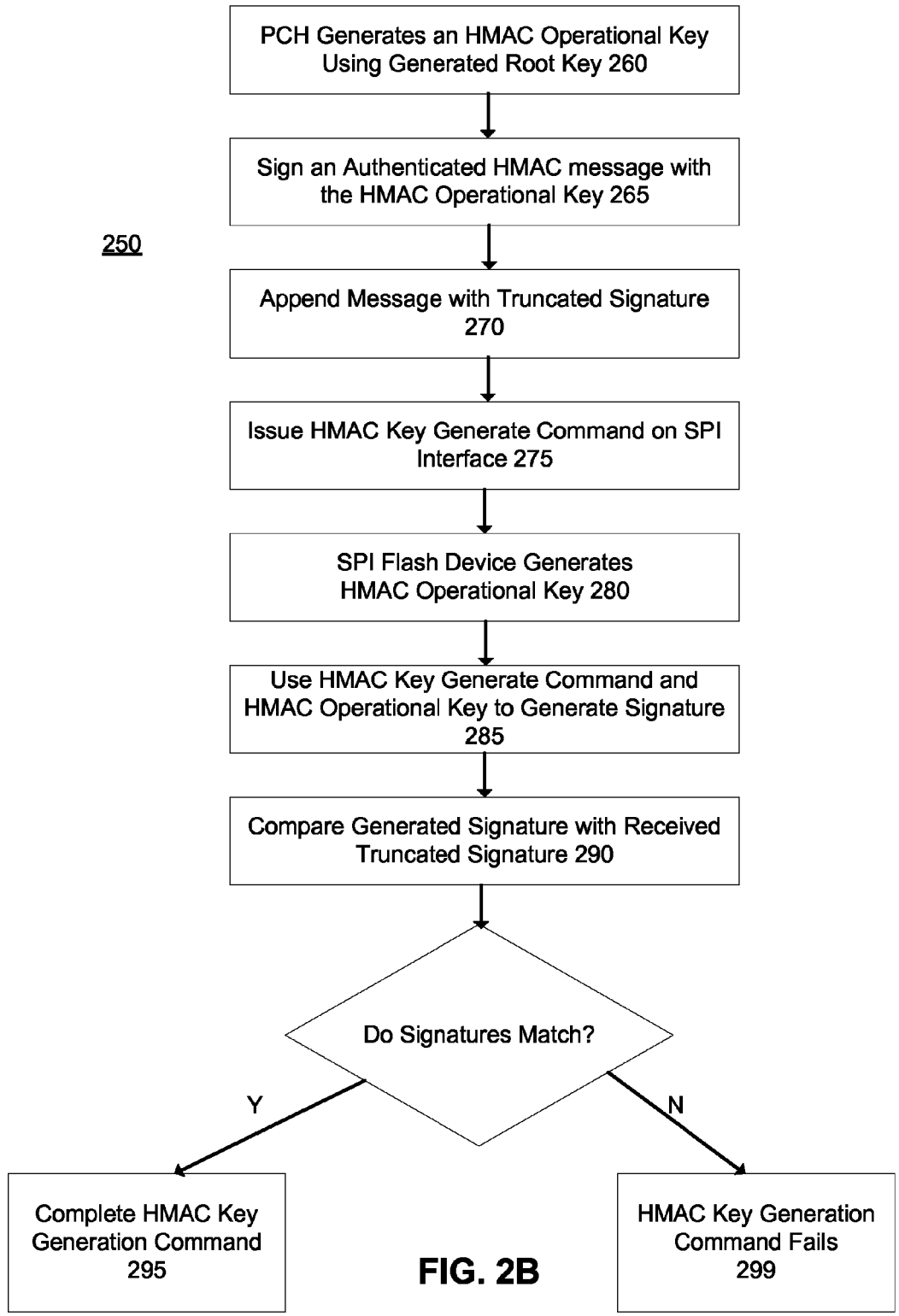
FIG. 2B is a flow chart for a process to generate an HMAC Operational key according to an embodiment of the invention.

FIG. 2B is a flow chart for a process to generate an HMAC Operational key according to an embodiment of the invention. During normal operation of process 250, the platform interconnect generates an HMAC Operational key using the aforementioned generated root key, 260. In one embodiment platform interconnect uses the current security version number as the message data. The HMAC Operational key generated by the platform interconnect is in turn used to sign the authenticated HMAC message, 265. The corresponding signature is appended to the message, 270. In this embodiment, the signature is "truncated" as described above.

The HMAC Key Generate command is issued on the SPI interface that contains a security version number, 275. Once the command is received by the SPI device, it uses the security version number and the previously programmed root key to generate the HMAC Operational key, 280. The SPI device then uses the entire HMAC Key Generate command as the message data and the HMAC Operational key as the key to generate a signature, 285. It compares portions of the generated signature with the truncated signature received as part of the command, 290. If the two signatures match the HMAC Key Generate command is allowed to successfully complete, 295; otherwise, the HMAC Key Generate command fails, 299.

Figure 3:
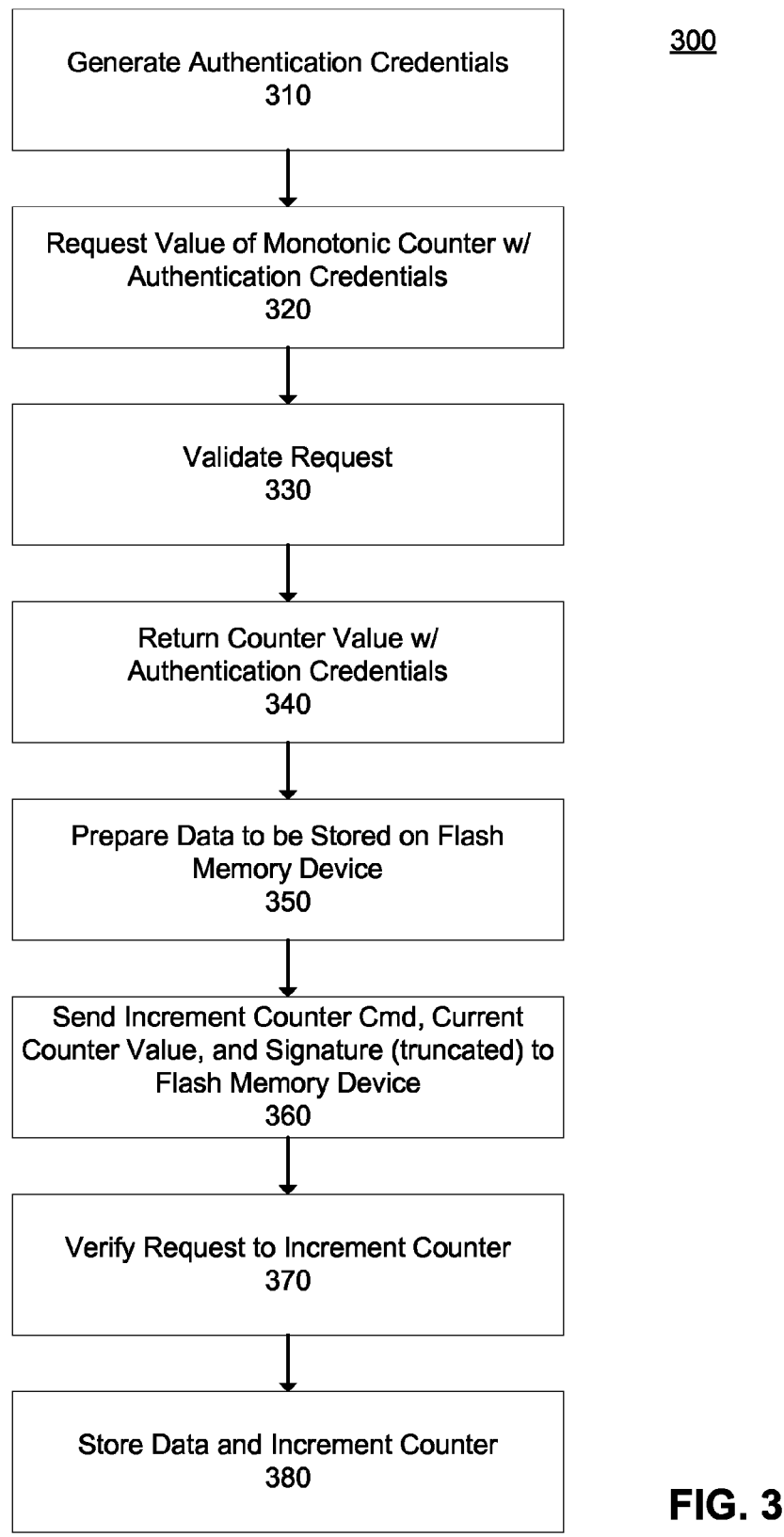
FIG. 3 is a flow chart for obtaining a monotonic counter value according to an embodiment of the invention.

FIG. 3 is a flow chart for obtaining a monotonic counter value according to an embodiment of the invention.

As shown in process 300, ME firmware of a platform interconnect may generate authentication credentials, 310. In one embodiment, said authentication credentials comprise a nonce, (i.e., a random or pseudo-random number) that is issued for authentication purposes described below.

Said ME firmware requests the value of a monotonic counter stored on an SPI flash memory device using the authentication credentials (the nonce) as part of the command, 320. In one embodiment, said request further includes an operational HMAC key based signature so that said SPI flash may authenticate the request for the monotonic counter value originated from an authenticated entity.

The SPI flash memory device validates the authenticated command, 330. If the command is authenticated (e.g., if it includes the correct signature signed using the HMAC key), the counter value is returned to the platform interconnect, along with the aforementioned authentication credentials (e.g., a nonce, signature), 340. The platform interconnect may use the counter value in a secure ME firmware execution environment if the nonce and signature are verified to be correct, 350 again using the Operational HMAC Key.

The ME firmware sends increment counter command, current monotonic counter value, along with a HMAC signature, 360. The SPI flash memory device verifies the request to increment the counter, 370 for proper signature (e.g., a truncated signature as described above) and current counter value. If it is verified, then the monotonic counter is incremented, 380. In some embodiments, a high water mark or threshold value is used for the monotonic counter, and the above described counter is not incremented on the flash memory device if the incremented counter equals or exceeds this threshold value. In response to the counter exceeding the threshold value, embodiments of the invention may re-initialize the counter (or utilize a different counter) and execute process 300 again.

Thus, as described above, embodiments of the invention utilize a monotonic counter storage mechanism moved off-chip (e.g., off the platform interconnect) to the SPI flash. This prevents any susceptibility of battery removal from prior art solutions utilizing volatile memory such as SRAM, due to the non-volatile storage of the flash memory device. Embodiments of the invention also result in a lower cost compared to prior art solutions that add a different flash memory device with replay protected storage or adding full data protection on an existing flash device.

For example, in a flash replacement attack, an attacker may be able to remove the flash memory device and reprogram the value of the monotonic counter to an older value; however with the current invention the counter contents cannot be rewritten unless the programmer can guess the device key. If the attacker replaces the SPI Flash with an entirely different flash the ME will detect this since the response coming back from the SPI Flash can no longer be authenticated for valid signature.

In a man-in-the-middle (MITM) attack, an attacker may attempt to manipulate the monotonic counter operation without the ME firmware stack knowing about its existence. For example, the attacker may want to substitute an old value of the monotonic counter in response to a read counter command issued from the platform interconnect; however, since each authenticated command is issued with a nonce, if the attacker replaced the response to the read command with an earlier response containing the old value of the monotonic counter, ME firmware will detect missing or incorrect nonce values.

Embodiments of the invention may further support multiple replay protected monotonic counters. Each individual monotonic counter may be available as a resource for an individual secure execution environment on a host platform. Thus, embodiments of the invention may isolate and protect the different secure execution environments from accessing the monotonic counter resources that do not belong to them. There may also be security vulnerability in one secure execution environment that may require some firmware update/recovery mechanism. Embodiments of the invention may therefore support independent firmware update/recovery by providing isolated secure execution environments.

While the above described embodiments illustrate embodiment of the inventions utilizing monotonic counters to provide an SEE for the platform interconnect, other embodiments provide an SEE for other platform components, such as processors or processing cores.

Figure 4:
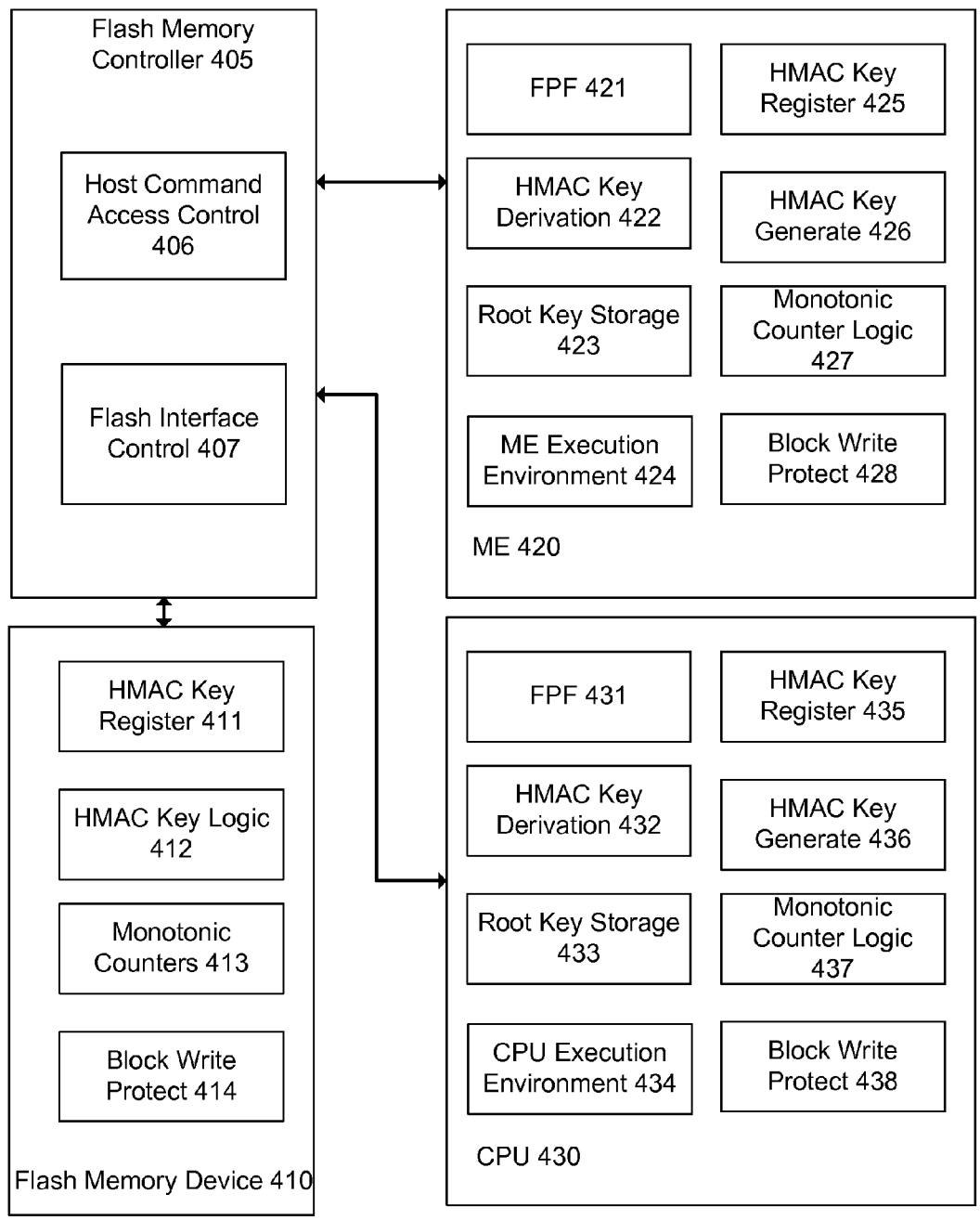
FIG. 4 is a block diagram of a system according to an embodiment of the invention.

FIG. 4 is a block diagram of a system according to an embodiment of the invention. In this embodiment, system 400 includes SPI flash memory device 410 that supports multiple replay protected monotonic counters. Each individual monotonic counter is available as a resource for an individual secure execution environment for various devices on the host platform. Embodiments of the invention isolate and protect the different secure execution environments from accessing monotonic counter resources that do not belong to them, in addition to protecting the counters from user attack.

SPI flash memory device 410 includes HMAC key register 411, HMAC Key logic 412, monotonic counters 413, and block write protection logic 414. HMAC key register 411 may store one or more HMAC keys received from Manageability Engine (ME) logic 420 and processor 430 (described below). Said HMAC keys may be associated with a specific monotonic counter. In one embodiment, HMAC key register 411 is non-readable. HMAC logic 412 may verify monotonic counter request commands received from ME 420 and processor 430, and may also generate authenticated responses to said commands.

Monotonic counters 413 may be hardware storage for a plurality of counter values. Said monotonic counters may also be configured to count (e.g., increment or decrement) when requested to do so, and to produce a monotonic count value in response to a read operation.

SPI flash controller 405 includes host command access control 406 and SPI flash interface control 407, to receive requests from the various components of system 400 and ensure that each SEE of system 400 is assigned a unique monotonic counter.

ME 420 includes FPF 421, HMAC key derivation 422, root key storage 423, ME execution environment 424, HMAC key register 425, HMAC Key Generate logic 426, monotonic counter logic 427, and block write protect 428. HMAC key derivation 422 may derive an HMAC key using the root key stored in root key storage 423 (said root key may be further derived from device key based on blown fuses of FPF 421). HMAC key register 425 may store said HMAC keys, and HMAC logic 426 may authenticate requests and commands to the monotonic counter assigned to ME 420 (e.g., commands as described in process 300 of FIG. 3).

Monotonic counter logic 427 may store retrieved values of its respective monotonic counter (i.e., one of monotonic counters 413) and may also store the address of its respective monotonic counter; thus SPI flash controller 405 forwards monotonic counter requests from ME 420 that are directed to the correct address, thus ensuring that ME execution environment 424 does not access unrelated monotonic counters.

Processor 430 includes FPF 431, HMAC key derivation 432, root key storage 433, processor execution environment 434, HMAC key register 435, HMAC logic 436, monotonic counter logic 437, and block write protect 438. processor execution environment 434 may be a secure execution environment accessible by the host system OS.

HMAC key derivation 432 may derive an HMAC key using the root key stored in root key storage 433 (said root key may be further be derived from device keys based on blown fuses of FPF 431). HMAC key register 435 may store said HMAC keys, and HMAC logic 436 may authenticate requests and commands to the monotonic counter assigned to processor 430 (e.g., commands as described in process 300 of FIG. 3).

Monotonic counter logic 437 may store retrieved values of its respective monotonic counter (i.e., one of monotonic counters 413) and may also store the address of its respective monotonic counter; thus SPI flash controller 405 may only forward monotonic counter requests from processor 430 that are directed to the correct address, thus ensuring that processor execution environment 434 does not access unrelated monotonic counters.

Figure 5:
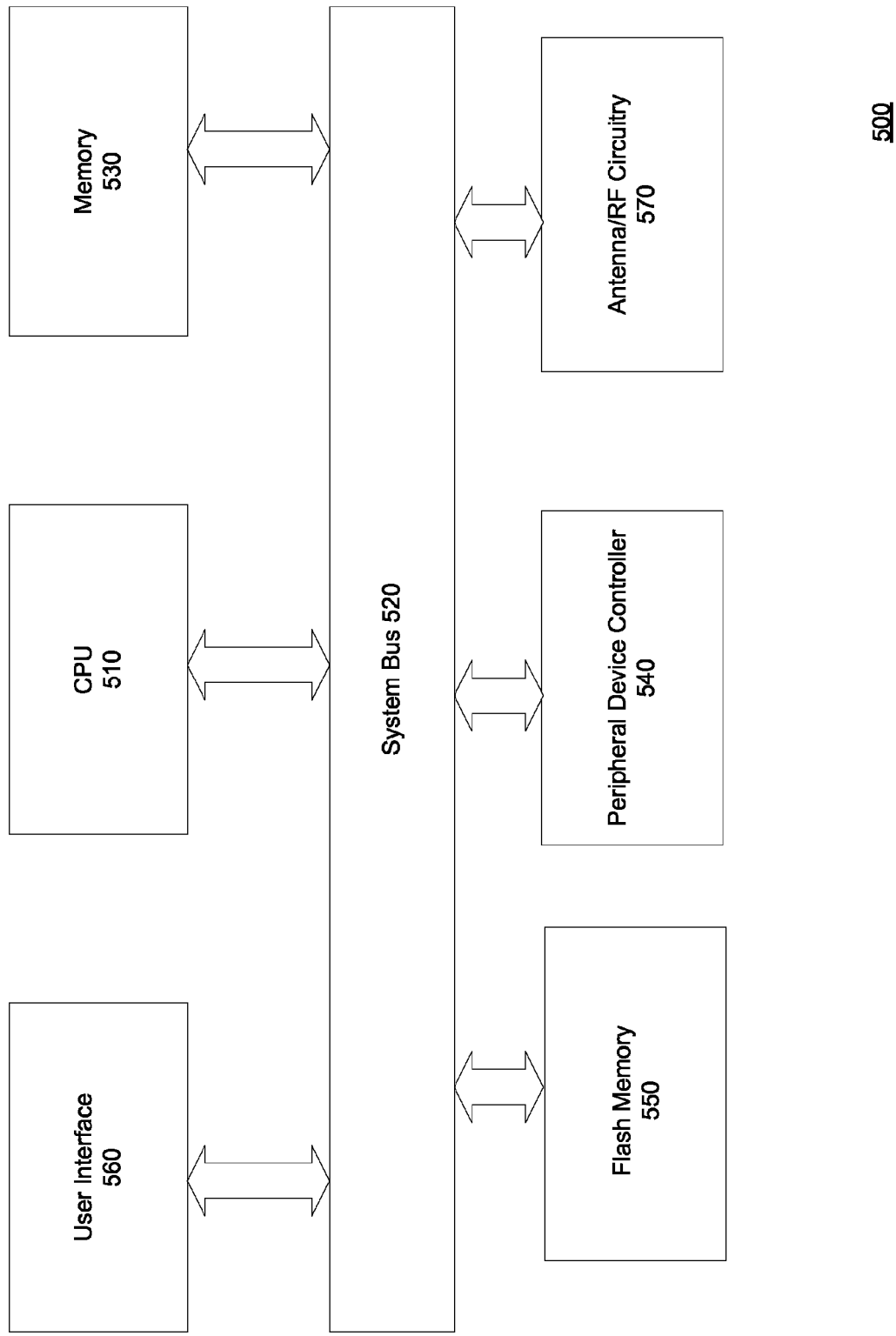
FIG. 5 is block diagram of a device that may utilize an embodiment of the invention.

FIG. 5 is block diagram of a device that may utilize an embodiment of the invention. Computing device 500 represents a mobile computing device, such as a computing tablet, a mobile phone or smartphone, a wireless-enabled e-reader, or other wireless mobile device. It will be understood that certain of the components are shown generally, and not all components of such a device are shown in device 500.

Device 500 includes processor 510, which performs the primary processing operations of device 500. Processor 510 can include one or more physical devices, such as microprocessors, application processors, microcontrollers, programmable logic devices, processor cores, or other processing means. The processing operations performed by processor 510 include the execution of an operating platform or operating system on which applications and/or device functions are executed. The processing operations include operations related to I/O (input/output) with a human user or with other devices, operations related to power management, and/or operations related to connecting device 500 to another device. The processing operations may also include operations related to audio I/O and/or display I/O.

In one embodiment, device 500 includes audio subsystem 520, which represents hardware (e.g., audio hardware and audio circuits) and software (e.g., drivers, codecs) components associated with providing audio functions to the computing device. Audio functions can include speaker and/or headphone output, as well as microphone input via any of the audio jacks described above. Devices for such functions can be integrated into device 500, or connected to device 500. In one embodiment, a user interacts with device 500 by providing audio commands that are received and processed by processor 510.

Display subsystem 530 represents hardware (e.g., display devices) and software (e.g., drivers) components that provide a visual and/or tactile display for a user to interact with the computing device. Display subsystem 530 includes display interface 532, which includes the particular screen or hardware device used to provide a display to a user. In one embodiment, display interface 532 includes logic separate from processor 510 to perform at least some processing related to the display. In one embodiment, display subsystem 530 includes a touchscreen device that provides both output and input to a user.

I/O controller 540 represents hardware devices and software components related to interaction with a user. I/O controller 540 can operate to manage hardware that is part of audio subsystem 520 and/or display subsystem 530. Additionally, I/O controller 540 illustrates a connection point for additional devices that connect to device 500 through which a user might interact with the system. For example, devices that can be attached to device 500 might include microphone devices, speaker or stereo systems, video systems or other display device, keyboard or keypad devices, or other I/O devices for use with specific applications such as card readers or other devices.

As mentioned above, I/O controller 540 can interact with audio subsystem 520 and/or display subsystem 530. For example, input through a microphone or other audio device can provide input or commands for one or more applications or functions of device 500. Additionally, audio output can be provided instead of or in addition to display output. In another example, if display subsystem includes a touchscreen, the display device also acts as an input device, which can be at least partially managed by I/O controller 540. There can also be additional buttons or switches on device 500 to provide I/O functions managed by I/O controller 540.

In one embodiment, I/O controller 540 manages devices such as accelerometers, cameras, light sensors or other environmental sensors, or other hardware that can be included in device 500. The input can be part of direct user interaction, as well as providing environmental input to the system to influence its operations (such as filtering for noise, adjusting displays for brightness detection, applying a flash for a camera, or other features). In one embodiment, device 500 includes power management 550 that manages battery power usage, charging of the battery, and features related to power saving operation.

Memory subsystem 560 includes memory devices for storing information in device 500. Memory can include nonvolatile (state does not change if power to the memory device is interrupted) and/or volatile (state is indeterminate if power to the memory device is interrupted) memory devices. Memory 560 can store application data, user data, music, photos, documents, or other data, as well as system data (whether long-term or temporary) related to the execution of the applications and functions of system 500.

Connectivity 570 includes hardware devices (e.g., wireless and/or wired connectors and communication hardware) and software components (e.g., drivers, protocol stacks) to enable device 500 to communicate with external devices. The device could be separate devices, such as other computing devices, wireless access points or base stations, as well as peripherals such as headsets, printers, or other devices.

Connectivity 570 can include multiple different types of connectivity. To generalize, device 500 is illustrated with cellular connectivity 572 and wireless connectivity 574. Cellular connectivity 572 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 574 refers to wireless connectivity that is not cellular, and can include personal area networks (such as Bluetooth), local area networks (such as WiFi), and/or wide area networks (such as WiMax), or other wireless communication.

Peripheral connections 580 include hardware interfaces and connectors, as well as software components (e.g., drivers, protocol stacks) to make peripheral connections. It will be understood that device 500 could both be a peripheral device ("to" 582) to other computing devices, as well as have peripheral devices ("from" 584) connected to it. Device 500 commonly has a "docking" connector to connect to other computing devices for purposes such as managing (e.g., downloading and/or uploading, changing, synchronizing) content on device 500. Additionally, a docking connector can allow device 500 to connect to certain peripherals that allow device 500 to control content output, for example, to audiovisual or other systems.

In addition to a proprietary docking connector or other proprietary connection hardware, device 500 can make peripheral connections 580 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type. Said peripheral connection hardware may utilize monotonic counters according to any of the embodiments of the invention described above.

Thus, embodiments of the invention describe systems including a flash memory device including a monotonic counter, and a host device, communicatively coupled to the flash memory device. Said host device is to generate authentication credentials including a multi-byte signature, request a value from the monotonic counter included in the flash memory device using a device key and the authentication credentials, including a truncated subset of the multi-byte signature, receive the value from the monotonic counter and the authentication credentials from the flash memory device, encrypt data with an incremented value from the monotonic counter, and send the encrypted data, the device key, and a command to increment the monotonic counter to the flash memory. Said the flash memory device is to validate the request for the value from the monotonic counter and the command to increment the monotonic counter with the device key.

In some embodiments, the flash memory device includes a second monotonic counter, and systems further include a second host device, communicatively coupled to the flash memory device. This second host device is to generate a second authentication credentials, request a value from the second monotonic counter included in the flash memory device using the second authentication credentials and a second device key, receive the value from the second monotonic counter and the second authentication credentials from the flash memory device, encrypt data with an incremented second value from the monotonic counter, and send the encrypted data, the second device key, and a command to increment the second monotonic counter to the flash memory. Said flash memory device is to validate the request for the value from the second monotonic counter and the command to increment the second monotonic counter with the second device key.

In some embodiments, the host device comprises a platform interconnect and the second host device comprises a processor, and the flash memory device is to store the device key and the second device key in non-readable key registers. In some embodiments, the flash memory device comprises a serial peripheral interface (SPI) flash memory device. In some embodiments, said device key is based on a plurality of field programmable fuses (FPFs) included in the host device.

In some embodiments, the host device is to encrypt the data based on a Hash-based Message Authentication Code/Secure Hash Algorithm (HMAC-SHA) algorithm, and the multi-byte signature comprises a 256-byte HMAC signature. In some embodiments, said authentication credentials comprise a nonce.

Embodiments of the invention describe apparatuses comprising a flash memory device controller, and a host device, communicatively coupled to the flash memory controller. Said host device is to generate authentication credentials including a multi-byte signature, request a value from the monotonic counter included in the flash memory device using a device key and the authentication credentials, including a truncated subset of the multi-byte signature, receive the value from the monotonic counter and the authentication credentials from the flash memory device, encrypt data with an incremented value from the monotonic counter, and send the encrypted data, the device key, and a command to increment the monotonic counter to the flash memory. Said the flash memory device is to validate the request for the value from the monotonic counter and the command to increment the monotonic counter with the device key.

In some embodiments, the flash memory device includes a second monotonic counter, and systems further include a second host device, communicatively coupled to the flash memory device. This second host device is to generate a second authentication credentials, request a value from the second monotonic counter included in the flash memory device using the second authentication credentials and a second device key, receive the value from the second monotonic counter and the second authentication credentials from the flash memory device, encrypt data with an incremented second value from the monotonic counter, and send the encrypted data, the second device key, and a command to increment the second monotonic counter to the flash memory. Said flash memory device is to validate the request for the value from the second monotonic counter and the command to increment the second monotonic counter with the second device key.

In some embodiments, the host device comprises a platform interconnect and the second host device comprises a processor, and the flash memory device is to store the device key and the second device key in non-readable key registers. In some embodiments, the flash memory device comprises a serial peripheral interface (SPI) flash memory device. In some embodiments, said device key is based on a plurality of field programmable fuses (FPFs) included in the host device.

In some embodiments, the host device is to encrypt the data based on a Hash-based Message Authentication Code/Secure Hash Algorithm (HMAC-SHA) algorithm, and the multi-byte signature comprises a 256-byte HMAC signature. In some embodiments, said authentication credentials comprise a nonce.

Embodiments of the invention describe methods including operations for generating authentication credentials including a multi-byte signature, requesting a value from a monotonic counter included in a flash memory device using a device key and the authentication credentials, including a truncated subset of the multi-byte signature, receiving the value and the authentication credentials from the monotonic counter, encrypting data with an incremented value from the monotonic counter, and sending the authenticated data, the device key, and a command to increment the monotonic counter to the flash memory device.

In some embodiments said flash memory device comprises a serial peripheral interface (SPI) flash memory device. In some embodiments, said device key is based on a plurality of field programmable fuses (FPFs).

In some embodiments, operations for encrypting the data are based on a Hash-based Message Authentication Code/Secure Hash Algorithm (HMAC-SHA) algorithm, and the multi-byte byte signature comprises a 256-byte HMAC signature. In some embodiments, said authentication credentials comprise a nonce.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The invention claimed is:
1. A system comprising:
a flash memory device including a monotonic counter; and
a host device, communicatively coupled to the flash memory device, to:
generate authentication credentials;
generate a multi-byte signature with a device key;
request a value from the monotonic counter included in the flash memory device using the authentication credentials, and a truncated subset of the multi-byte signature;
receive the value from the monotonic counter and the authentication credentials from the flash memory device;
send a signature generated with the device key and a command to increment the monotonic counter to the flash memory;
wherein the flash memory device is to validate the request for the value from the monotonic counter and the command to increment the monotonic counter with its own key.
2. The system of claim 1, wherein the flash memory device includes a second monotonic counter.
3. The system of claim 2, wherein the host device comprises a platform interconnect and a processor.
4. The system of claim 2, wherein the flash memory device is to store its own key in a non-readable key register.
5. The system of claim 1, wherein the flash memory device comprises a serial peripheral interface (SPI) flash memory device.
6. The system of claim 1, wherein the device key is based on a plurality of field programmable fuses (FPFs) included in the host device.
7. The system of claim 1, wherein, the host device is to receive the value, the value being authenticated based on a Hash-based Message Authentication Code/Secure Hash Algorithm (HMAC-SHA) algorithm, and the multi-byte signature comprises a 256-byte HMAC signature.
8. The system of claim 1, wherein the authentication credentials comprise a nonce.
9. An apparatus, comprising:
a host device to:
generate authentication credentials
generate a multi-byte signature with a device key;
request a value from a monotonic counter within a flash memory device using the authentication credentials and a truncated subset of the multi-byte signature, wherein the flash memory device is to validate the request for the value from the monotonic counter;

receive the value from the monotonic counter and the authentication credentials from the flash memory device; and, send a signature generated with the device key, and a command to increment the monotonic counter to the flash memory device wherein the flash memory device is to validate the command in order to increment the monotonic counter with its own key.

10. The apparatus of claim 9, wherein the host device comprises a platform interconnect.

11. The apparatus of claim 9, wherein the host device comprises a processor.

12. The apparatus of claim 9, wherein the host device comprises a serial peripheral interface (SPI) flash memory controller.

13. The apparatus of claim 9, wherein the device key is based on a plurality of field programmable fuses (FPFs) included in the host device.

14. The apparatus of claim 9, the host device is to generate the credentials based on a Hash-based Message Authentication Code/Secure Hash Algorithm (HMAC-SHA) algorithm, and the multi-byte signature comprises a 256-byte HMAC signature.

15. The apparatus of claim 9, wherein the authentication credentials comprise a nonce.

16. A method comprising:
performing the following by a host that is coupled to a flash memory device:
generating authentication credentials;
generating a multi-byte signature;
requesting from the flash memory device a value of a monotonic counter included in the flash memory device using the authentication credentials, and a truncated subset of the multi byte, signature ,wherein the flash memory device is to validate the request for the value from the monotonic counter;
receiving the value and the authentication credentials from the monotonic counter;
sending a signed command to increment the monotonic counter to the flash memory device, wherein the flash memory device is to validate the command in order to increment the monotonic counter with its own key.

17. The method of claim 16, wherein the flash memory device comprises a serial peripheral interface (SPI) flash memory device.

18. The method of claim 16, wherein a device key of the host is based on a plurality of field programmable fuses (FPFs).

19. The method of claim 16, wherein the multi-byte signature is based on a Hash-based Message Authentication Code/Secure Hash Algorithm (HMAC-SHA) algorithm, and the multi-byte signature comprises a 256-byte HMAC signature.

20. The method of claim 16, wherein the authentication credentials comprise a nonce.

* * * * *